United States Patent [19]

Weber

[11] 4,438,159
[45] Mar. 20, 1984

[54] COATING PROCESS

[75] Inventor: Hermann Weber, Tarzana, Calif.

[73] Assignee: Techsight Corporation, Wilmington, Del.

[21] Appl. No.: 355,362

[22] Filed: Mar. 8, 1982

[51] Int. Cl.³ ............................ G02B 1/10; B05D 1/18
[52] U.S. Cl. ..................................... 427/162; 427/164; 427/169; 427/335; 427/430.1
[58] Field of Search ............ 427/162, 164, 169, 430.1, 427/335

[56] References Cited

U.S. PATENT DOCUMENTS 3,339,562  9/1967  Bradley et al. ............... 427/335 X
3,539,381  11/1970  Kayarian ............................. 427/335
4,007,304  2/1977  Dunn et al. ...................... 427/335 X Primary Examiner—James R. Hoffman Attorney, Agent, or Firm—Blakely, Sokoloff, Taylor & Zafman

[57] ABSTRACT

The present invention comprises a method and apparatus for providing a uniform coating on objects such as a lens. A bath of coating solution is provided and the object to be coated is immersed into the solution. The object is then removed into an atmosphere substantially saturated with the coating solution. The object is maintained in the substantially saturated atmosphere for a predetermined time to allow excess coating material to disperse and flow off the surface of the object. The object is then withdrawn from the saturated atmosphere and dried in the conventional manner. The maintenance of the object within the substantially saturated atmosphere for the predetermined time eliminates the formation of puddles and drip lines.

5 Claims, 4 Drawing Figures

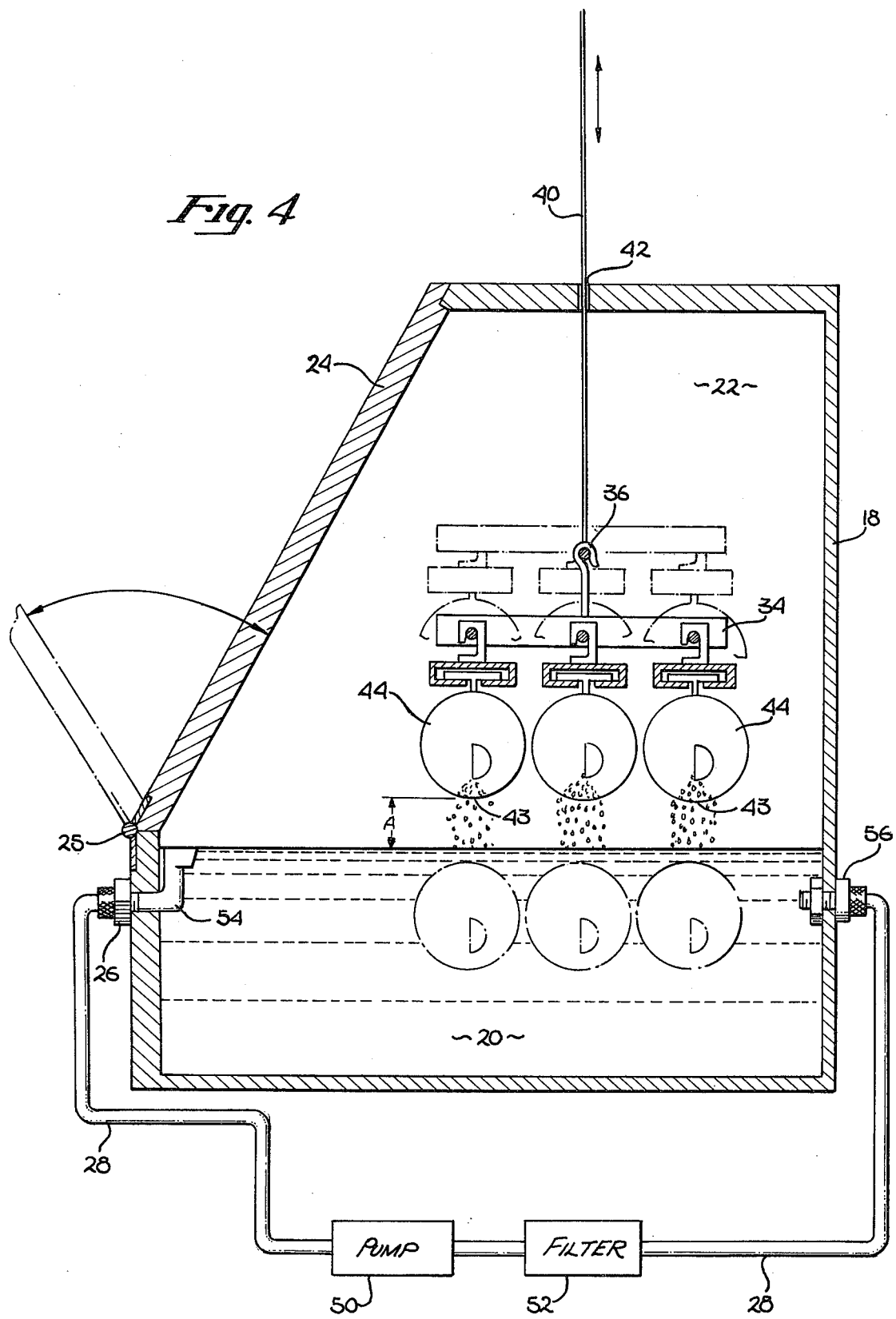

COATING PROCESS

BACKGROUND OF THE INVENTION

1. Field of the Invention

The present invention relates to the field of coating processes, particularly those processes used to coat optical materials.

2. Art Background

Typically, during the manufacture of an optical material a coating is applied to one or more surfaces of the material to achieve the desired optical characteristics of tint, increased abrasion resistance, anti-reflection properties, or to provide some other desired optical quality. For example, optical lenses are typically coated with a silicone anti-abrasion coating such as Dow Corning Q9-6312 or General Electric Coating SHC 1200, which may form part of an optical article such as for example eyeglasses, goggles, visors and the like.

Lenses coated according to one method used in the prior art are immersed into a coating solution and then removed for drying. Another method commonly used is to spin the lens and to flow a coating material at an angle onto the surface of the optical element. However, in the case where multi-focal lens elements are to be coated (such as bi or tri focals), coating methods known in the prior art do not provide aberration free optical surfaces since the coating material tends to flow along the top ledge of the multi-focal element and puddle or streak prior to drying (see FIG. 1). In addition, where a spray or immersion coating method is used to coat a multi-focal optical lens, frequently a fillet of dried coating material forms at the top ledge separating the primary optical surface from the secondary generally semi-circular optical region (see FIG. 2). If a tint or dye is then applied to the multi-focal lens, the fillet takes on a darker appearance by absorbing more of the tint or dye, and a dark segment line is visible. This line optically and cosmetically interferes with the use of the lens and is therefore undesirable.

The inability of standard coating processes to achieve a distortion-free coating frequently renders the lens element unusable, inasmuch as the puddles and/or drip lines contribute to eyestrain and a degradation of image quality for the user. Accordingly, there exists a need for a coating process which provides a uniform, aberration-free coating, on multi-focal lenses and other optical articles having discontinuities on the optical surface.

As will be discussed below, the present invention overcomes the disadvantages of the prior art coating methods, and provides a uniform distortion free coating an optical materials, particularly multi-focal lenses.

SUMMARY OF THE INVENTION

The present invention is most advantageously used in conjunction with multi-focal optical lenses. The invention comprises a method and apparatus for providing a uniform coating on objects such as a lens. A bath of coating solution is provided and the object to be coated is immersed into the solution. The object is maintained within the coating solution to allow the temperature of the object to approximately equal the temperature of the solution. The object is then removed into an atmosphere substantially saturated with the coating solution. The object is maintained in the substantially saturated atmosphere for a predetermined time to allow excess coating material to dispose and flow off the surface of the object. The object is then withdrawn from the saturated atmosphere and dried in the conventional manner. The maintenance of the object within the substantially saturated atmosphere for the predetermined time eliminates the formation of puddles and drip lines.

BRIEF DESCRIPTION OF THE DRAWINGS

FIG. 2 is a side view of a multi-focal lens illustrating the build-up of coating material along the ledge of the multi-focal element which occurs when using prior art coating processes.

FIG. 4 is a diagramatical cross section taken along line 4—4 of FIG. 3, illustrating the coating process of the present invention.

DETAILED DESCRIPTION OF THE INVENTION

A process and apparatus for providing a more uniform coating on objects is disclosed. In the following description for purposes of explanation, specific coatings, materials, numbers, etc., are set forth to provide a thorough understanding of the present invention. However, it will be apparent to one skilled in the art that the present invention may be practiced without these specific details.

Figure 1:
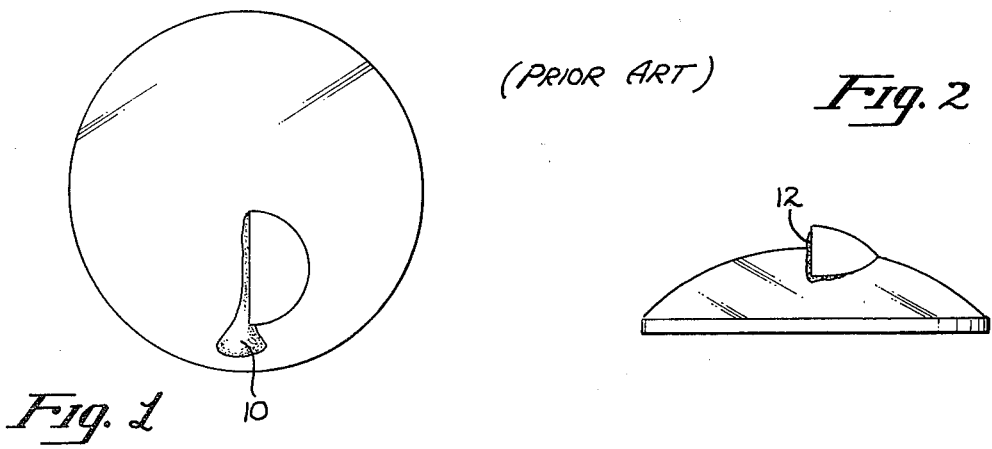
FIG. 1 is a front view of a multi-focal lens illustrating the puddling of coating material which occurs when using prior art coating processes.

As discussed above, multi-focal lenses coated according to methods of the prior art frequently exhibit defects such as puddling 10, as illustrated in FIG. 1. Similarly, where prior art flow or immersion coating methods are used to coat a multi-focal optical element, a fillet 12 of dried coating material may form as shown in FIG. 2.

Figure 3:
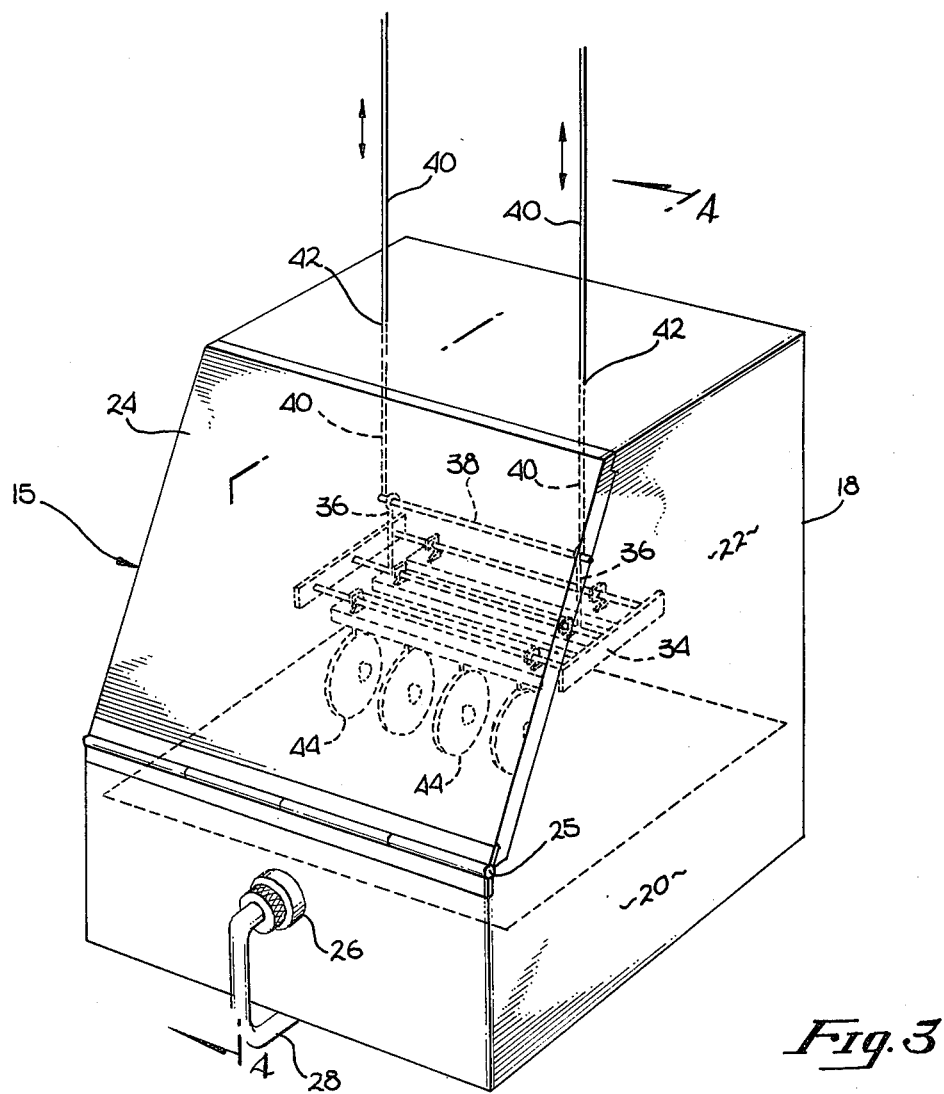
FIG. 3 is a perspective view of the present invention illustrating the coating diptank in a closed position.

Referring now to FIG. 3, the present system for coating optical objects is indicated generally by reference numeral 15. System 15 includes a diptank housing 18 having a lower fluid reservoir 20, and an upper airspace 22. A loading hatch 24 is hingedly attached to the housing 18 by hinge 25, and forms one wall defining the upper airspace 22, thereby allowing access to the interior of the housing 18. Loading hatch 24 incorporates appropriate seals such that when the hatch is in a closed position, as shown in FIG. 3, the interior of the housing is substantially sealed off from the ambient outside environment.

An outlet overflow port 26 is provided near the upper portion of the fluid reservoir 20, as illustrated, and is coupled to line 28. As will be discussed below, the overflow port 26 and line 28 form part of a coating solution recirculation system. A rack 34 (shown in phantom lines in FIG. 3) is supported within housing 18 by hooks 36 which engage a cross bar 38. Cross bar 38 is in turn supported at each end by hoist lines 40, which pass through holes 42 provided in the top portion of the housing 18, and are coupled to a pulley motor device (not shown) to raise and lower the rack 34 within the housing as defined.

A plurality of lenses 44, which may include lenses of the multi-focal variety, are suspended below rack 34 by appropriate mounting means. The mounting means preferred in order to coat one or more surfaces of a lens is that described in my co-pending U.S. patent application, Ser. No. 344,491 filed on Feb. 1, 1982. However, it will be appreciated that any suitable mounting means may be used in order to suspend the lenses 44 below the rack.

Referring now to FIG. 4, the coating process of the present invention will be described in detail. Lenses 44, including multi-focal lenses such as bi and tri focals, are suspended below rack 34, as illustrated. In the presently preferred embodiment, the lenses 44 are loaded onto the rack such that the multi-focal ledge on a lens is oriented substantially vertically. It will be appreciated that although the present invention is most advantageously used in conjunction with multi-focal lenses, the present invention can provide a uniform coating on single vision or any type of lens or other optical article. Typically, 10 to 27 lenses are supported by rack 34 for coating. The rack 34 is then hung within the diptank housing onto the cross bar 38 by hooks 36, and the hatch 24 is then closed, thereby substantially sealing the interior of the housing from the outside environment.

The desired coating solution to be applied to the lenses is provided within the lower fluid reservoir 20. Typical coating solutions which are used in the art include the anti-abrasion coatings of Dow Corning Q9-6312 and General Electric coating SCH 1200. The coating solution is circulated and filtered by pump 50 and filter 52, to insure that only clean coating solution is maintained within the fluid reservoir 20. An outlet drain 54 is coupled to the outlet overflow port 26 through the wall of housing 18, in order to permit fluid to be pumped from the reservoir through the filter 52. Similarly, an inlet port 56 is disposed below the level of the coating solution within the reservoir, as illustrated, in order to re-introduce the filtered coating solution into the fluid reservoir 20. The solution level is thereby maintained such that it slightly exceeds the level of the outlet drain. Thus, fluid is conveyed by the pump 50 through line 28 and filter 52, and is re-introduced into the reservoir through inlet port 56. It has been found that the presently preferred embodiment's arrangement of inlet and outlet ports within the housing 18 results in minimal turbulence of the coating solution within the reservoir. Additionally, it has been found that optimal results are achieved if the coating solution is maintained at a substantially constant temperature within the range of 35 to 70 degrees fahrenheit.

As a result of the relatively high vapor pressure of coating solutions used in the art, vapors rise from the coating solution's surface and substantially saturate the atmosphere within the upper airspace 22. Inasmuch as hatch 24 is substantially sealed, a saturated atmosphere develops within the airspace 22, the percent of saturation being greatest near the surface of the coating solution and decreasing with height above the surface within the housing 18.

In coating the lenses, a user lowers the rack 34 on hoist lines 40 such that the lenses 44 are immersed into the coating solution. After a predetermined time has elapsed to allow the temperature of the lens to approximately equal the temperature of the solution (typically 30 seconds to 2 minutes), the lenses are withdrawn from the solution by raising the rack 34 at a predetermined rate. It has been found that by permitting the temperature of the lens to generally equal that of the solution, premature setting of the coating solution is avoided. The specific rate of withdrawal from the coating solution is a function of the temperature, viscosity and type of the particular coating solution used. As illustrated in FIG. 4, the rack is raised within the housing 18 such that the bottom edge 43 of the lenses 44 are approximately a distance "A" above the surface of the coating solution. In practice, it has been found that for optimal results the distance "A" corresponds to approximatley $\frac{1}{2}$ to 7 inches above the surface of the coating solution. The lenses 44 are suspended within the substantially saturated atmosphere a distance "A" above the solution surface for approximately 60 to 120 seconds, to allow gravity to drain excess coating solution to the bottom edge of each lense and drip off into the coating solution. The presence of the substantially saturated atmosphere precludes the coating solution deposited on each lens from setting, and thereby prevents the formation of drip lines and puddles, for example near the ledge of a multi-focal element. It will be appreciated by one skilled in the art, that the specific time and height which the lenses are maintained above the coating solution is a function of the temperature and the type of solution used. Once the desired drain time has elapsed rack 34 is raised within the housing 18 at a rate of 3 to 8 inches per minute upward. In practice, it has been found that an upward movement of 6 inches per minute provides the optimum coating for most lenses and solutions. Since the atmosphere within the upper airspace 22 is most heavily saturated near the surface of the coating solution, and progressively less so toward the top of the housing, the coating solution deposited on the lenses 44 begins to set once removed from the heavily saturated atmosphere a distance "A" above the solution. Hatch 24 is then opened, and the rack with its associated lenses 44 is then removed and the lenses fully dried using techniques well known in the art.

Thus, a process and apparatus for providing a more uniform coating on a lens and other optical materials has been disclosed. While the process has been particularly described with reference to FIGS. 3 and 4, it should be understood that the figures are for illustration only and should not be taken as limitations upon the invention. In addition, it is contemplated that many changes and modifications may be made, by one of ordinary skill in the art to the materials and arrangements of elements of the invention, without departing from the spirit and scope of the invention.

I claim:

1. An improved method for coating an optical material comprising the steps of:
    (a) providing a volume of coating solution in an enclosed housing;
    (b) providing an atmosphere substantially saturated with said coating solution;
    (c) suspending said optical material above the surface of said volume of coating solution;
    (d) lowering said optical material into said coating solution;
    (e) maintaining said optical material within said coating solution for a predetermined time such that the temperature of said material generally equals the temperature of said solution;
    (f) progressively withdrawing said optical material out of said volume of coating solution;
    (g) suspending said optical material above said coating solution within said saturated atmosphere for a predetermined time;
    (h) withdrawing said optical material from said saturated atmosphere;
    whereby a more uniform coating is provided on said optical material.

2. The method according to claim 1 wherein said optical material is suspended within said saturated atmosphere for 60 to 120 seconds.

3. The method according to claim 2 wherein said optical material is withdrawn from said saturated atmosphere at a rate of 3 to 8 inches per minute.

4. The method according to claim 3 wherein said optical material is suspended within said saturated atmosphere ½ to 7 inches above said volume of coating solution.

5. The method according to claim 1, wherein said volume of coating solution is maintained at a temperature within the range of 25 to 70 degrees Fahrenheit.

* * * * *